No. 778,107. Patented December 20, 1904.

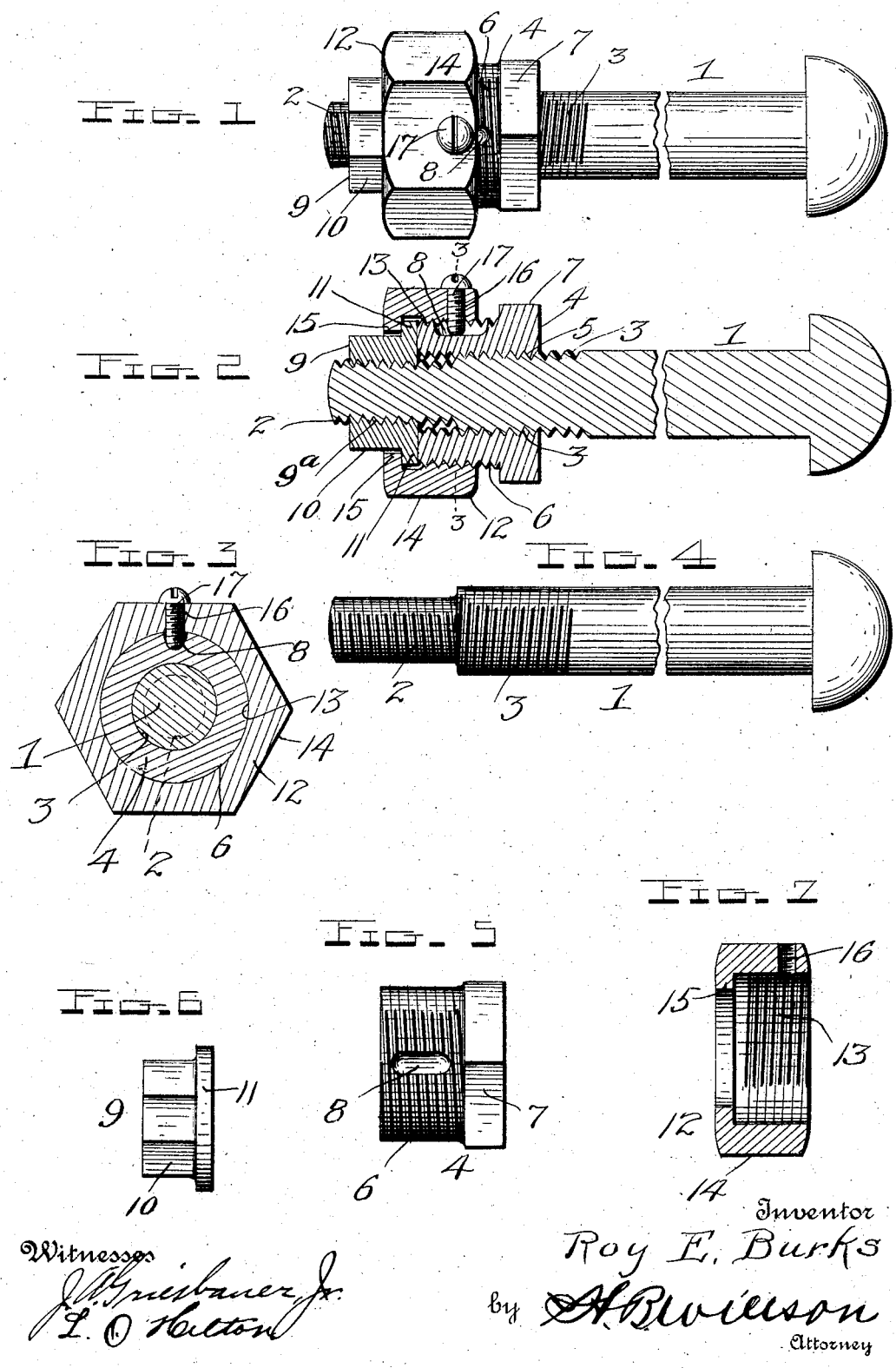

UNITED STATES PATENT OFFICE.

ROY E. BURKS, OF PAULS VALLEY, INDIAN TERRITORY.

NUT AND BOLT LOCK.

SPECIFICATION forming part of Letters Patent No. 778,107, dated December 20, 1904.

Application filed September 26, 1904. Serial No. 226,035.

*To all whom it may concern:*

Be it known that I, ROY E. BURKS, a citizen of the United States, residing at Pauls Valley, in the Chickasaw Nation, Indian Territory, have invented certain new and useful Improvements in Nut and Bolt Locks; and I do declare the following to be a full, clear, and exact description of the invention, such as will enable others skilled in the art to which it appertains to make and use the same.

My invention relates to improvements in nut and bolt locks of that class in which the nut is locked to the bolt.

The object of my invention is to provide a device of this character which will be simple in construction, durable in use, efficient in operation, and comparatively inexpensive to manufacture.

With the above and other objects in view the invention consists in certain novel features of construction, combination, and arrangement of parts hereinafter fully described and claimed, and illustrated in the accompanying drawings, in which—

Figure 1 is a side elevation of a nut and bolt lock constructed in accordance with my invention. Fig. 2 is a vertical longitudinal sectional view of the same. Fig. 3 is a vertical transverse sectional view taken on the plane indicated by the line 3 3 of Fig. 2. Fig. 4 is a detail view of the bolt or rod. Fig. 5 is a detail view of the inner nut. Fig. 6 is a detail view of the outer nut, and Fig. 7 is a detail sectional view through the cap-nut.

Referring to the drawings by numeral, 1 denotes a bolt, rod, or the like formed at one of its ends with oppositely-screw-threaded portions 2 and 3, the outer portion 2 being reduced or of less diameter than the portion 3. Upon said screw-threaded portion 3 is an inner nut 4, formed with internal screw-threads 5, adapted to engage said portion 3, external threads 6, having the same direction as the threads 2, but preferably of a different pitch, and an outer polygonal-shaped portion 7, adapted to be engaged by a wrench when it is desired to rotate said nut. Said nut 4 is also formed with a recess 8, the purpose of which will be presently explained.

Upon the screw-threaded portion 2 is an outer nut 9, formed with internal screw-threads 9ª to engage said threads 2, an outer polygonal-shaped portion 10, adapted to be engaged by a wrench, and an annular flange or shoulder 11, located at its rear or inner end. Said nut 9 is of less diameter than the nut 4, and upon the latter is a cap-nut 12, which is formed with internal screw-threads 13 to engage the external threads upon the nut 4 and with an external polygonal-shaped portion 14, adapted to be engaged by a wrench. Said cap-nut 12 is formed at its front end with an inwardly-projecting annular flange or shoulder 15, which is adapted to engage said shoulder 11, as shown in Fig. 2 of the drawings, to prevent the outer nut 9 from being unscrewed from the said portion 2 of the bolt. Said cap-nut 14 is also formed with a screw-threaded opening 16, which is adapted to receive a screw 17, the inner end of which projects into said recess 8 in the inner nut 4 to lock said cap-nut upon the latter.

The use, operation, and advantages of my invention will be readily seen upon reference to the drawings. After the inner nut 4 has been screwed upon the portion 3 of the bolt so as to engage the object through which the bolt passes the outer nut 9 is then screwed upon the portion 2 of the bolt until the same binds the outer end of the nut 4. Said portions 2 and 3 of the bolt are oppositely threaded—that is, one is a right-hand and the other a left-hand thread—so that the outer nut will bind the inner one; but in order to prevent the outer nut from rotating the cap 14 is placed over the nut 9 and upon the nut 4 and is then locked on by means of the screw 17 or any other suitable fastening means.

While I have shown or described the preferred embodiment of my invention, it will be understood that I do not wish to be limited to the precise construction herein set forth, since various changes in the form, proportion, and minor details of construction may be resorted to without departing from the principle or sacrificing any of the advantages of my invention.

Having thus described my invention, what I claim as new, and desire to secure by Letters Patent, is—

1. The combination of a bolt or rod having oppositely-screw-threaded portions of different diameters upon one of its ends, an inner nut upon one of said screw-threaded portions and formed with an externally-screw-threaded portion, an outer nut upon the other of said screw-threaded portions and provided with a shoulder, a cap-nut upon said externally-screw-threaded portion of said inner nut and provided with a shoulder to engage said shoulder upon said outer nut, and means for locking said cap-nut to said inner nut, substantially as described.

2. The combination of a bolt or rod having oppositely-screw-threaded portions of different diameters on one of its ends, an inner nut upon one of said screw-threaded portions of said bolt and formed with external screw-threads of a different pitch than those upon said bolt, an outer nut upon the other of said screw-threaded portions of said bolt and provided with a shoulder, a cap-nut upon the external screw-threads of said inner nut and provided with a shoulder to engage the first-mentioned shoulder, substantially as described.

3. The combination of a bolt or rod having oppositely-screw-threaded portions of different diameter upon one of its ends, an inner nut upon one of said screw-threaded portions and formed with an externally-screw-threaded portion, an outer nut upon the other of said screw-threaded portions of said bolt and provided with a shoulder, a cap-nut upon said externally-screw-threaded portion of said inner nut and provided with a shoulder adapted to engage said shoulder upon said outer nut, and a transverse locking-key for securing said cap-nut upon said inner nut, substantially as described.

4. The combination of a bolt or rod having oppositely-screw-threaded portions of different diameter upon one of its ends, an inner nut upon one of said screw-threaded portions and formed with an externally-screw-threaded portion, an outer nut upon the other of said screw-threaded portions of said bolt and provided with a shoulder, a cap-nut upon said externally-screw-threaded portion of said inner nut and provided with a shoulder adapted to engage said shoulder upon said outer nut, and a screw for securing said cap-nut upon said inner nut, substantially as described.

5. The combination of a bolt or rod having oppositely-screw-threaded portions of different diameters upon one of its ends, an inner nut upon one of said screw-threaded portions of said bolt and formed with an externally-screw-threaded portion and a recess, an outer nut upon the other of said screw-threaded portions of said bolt and formed with an annular shoulder, a cap-nut upon said externally-screw-threaded portion of said inner nut and formed with an annular shoulder to engage said shoulder upon said outer nut and a screw-threaded opening, and a screw adapted to pass through said screw-threaded opening and into said recess to lock said cap-nut upon said inner nut, substantially as described.

In testimony whereof I have hereunto set my hand in presence of two subscribing witnesses.

ROY E. BURKS.

Witnesses:
J. C. ELLIOTT,
J. T. BLANTON.